Feb. 9, 1926.
G. F. COLLEY
BOLT LOCK
Filed June 27, 1923
1,572,770
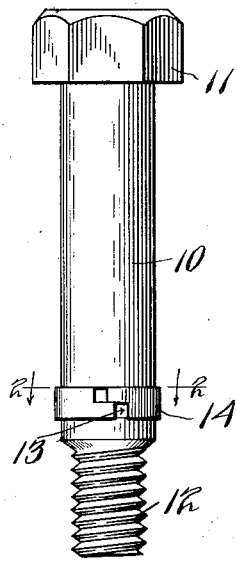
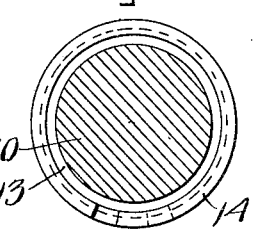
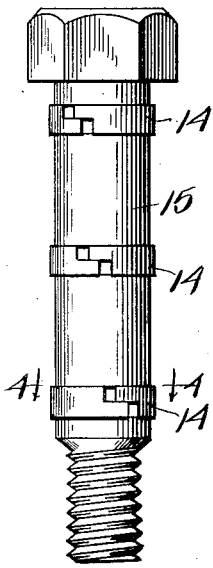
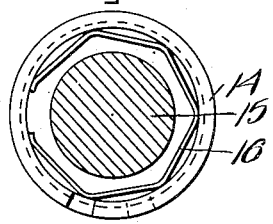
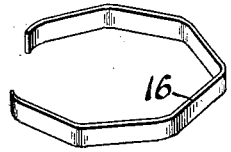
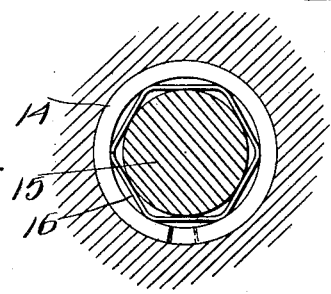
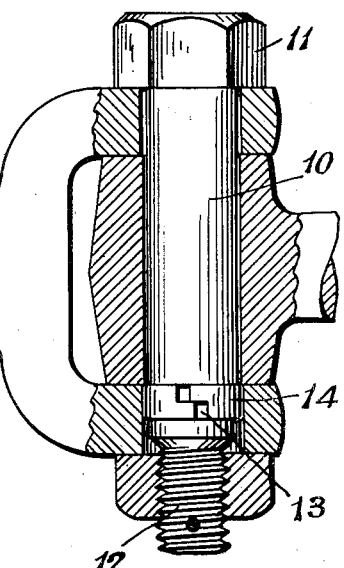
Inventor
George F. Colley
By
Attorney Patented Feb. 9, 1926.

1,572,770

UNITED STATES PATENT OFFICE.

GEORGE F. COLLEY, OF MEMPHIS, TENNESSEE, ASSIGNOR OF ONE-HALF TO JOHN Q. ROBERTS, OF MEMPHIS, TENNESSEE.

BOLT LOCK.

Application filed June 27, 1923. Serial No. 648,099.

*To all whom it may concern:*

Be it known that I, GEORGE F. COLLEY, a citizen of the United States, residing at Memphis, in the county of Shelby and State of Tennessee, have invented certain new and useful Improvements in Bolt Locks, of which the following is a specification.

My said invention relates to a bolt lock and it is an object of the same to provide means which shall permit a bolt to be placed in position or removed therefrom without unnecessary difficulty but which shall effectively prevent accidental loss of the same. A further object of the invention is to provide means which shall be capable of acting as a bolt lock and shall also operate effectively as a means for preventing vibration. As is well known the vibration of mechanisms and parts of mechanisms connected by bolts is the primary cause for separation of the nuts from the bolts and the consequent loss of bolts whereby serious losses and accidents are oftentimes brought to pass. My device has a two-fold purpose in that it cushions the vibrations and thereby reduces danger of loss of the nuts from the bolts but should they be lost it still acts to prevent withdrawal of the bolts.

Referring to the accompanying drawings, which are made a part hereof and on which similar reference characters indicate similar parts, Figure 1 is an elevation of a conventional bolt having my device applied thereto, Fig. 2, a section on line 2—2 of Figure 1, Figure 3, an elevation of a bolt showing another form in which my invention may be applied, Figure 4, a section on line 4—4 of Figure 3, and Figure 5, a detail of a part shown in Figure 4.

Figure 6, is a view similar to Figure 4, with the rings in contracted position.

Figure 7 is a side view partly in section illustrating one application of my invention.

In the drawings reference character 10 indicates a bolt which may be of any conventional form and which is here shown as having a head 11 and a threaded part 12. Near the lower end an annular groove is formed at 13 in which is located a split ring 14. As illustrated in Figures 1 and 2 the relative dimensions of the parts are such that the ring can not be accidentally removed from the groove while if the ring is firmly compressed its outer surface will be coincident with that of the bolt. This facilitates positioning of the bolt since the spring ring can be pressed together by means of a pair of pliers or the like while the bolt is inserted after which the ring will spring out and bear against the sides of the opening thereby acting frictionally to prevent removal of the bolt. In cases where the bolt passes through several parts the ring may also act positively against an edge of one of said parts provided they are separated or the ring is otherwise afforded an opportunity to expand. If the head 11 is replaced by a nut having threaded connection with the bolt and this nut should be lost, the ring 14 will still tend to prevent endwise movement of the bolt, i. e. it acts to prevent movement in either direction. The spring ring also acts to reduce vibration particularly if the space about the ring is filled with oil so as to resist relative lateral movements of the ring and the bolt. This is especially true if there is opportunity for sidewise movement between the bolt and the opening in which it is located.

In the modified form of Figure 3 a series of rings 14 are positioned in spaced annular grooves about the bolt 15. This figure is intended to represent a bolt or rod of any length and it will be seen that the frictional action of the spring rings tending to remove the bolt is a cumulative one and may be so strong that such rings will safely hold in place a rod having neither heads nor nuts at its ends to hold it in place. Furthermore the rings would act positively to hold such a rod in place if there were any abutments near the ends of the bolt or rod against which the rings could strike in case of endwise movement. These rings, of course, would also have the vibration quenching action above referred to, especially if the grooves are filled with oil.

In the form of bolt shown in Figure 3 split rings such as that at 14 in Figure 1 may be used with good results but I prefer to use therewith a spring ring such as is shown in the remaining figures at 16. This ring consists of a strip of steel bent at spaced intervals to provide a split ring fitting inside the ring 14. When the ring 14 is expanded the ends of the ring 16 may be separated as indicated in Figure 4 whereas when the ring 14 is pressed together the ends of the ring 16 will also approach each other closely. At such times due to the angular construction of the ring 16 it will bear alternately against the bolt 15 and the inner face of the split ring 14 so that any relative movement between the bolt 15 and the ring 14 will act to distort the inner spring ring and will be opposed by the resilient action of the same. The groove in the bolt must be made somewhat deeper where the ring 16 is also to be used.

It will be obvious to those skilled in the art that my device may be modified in various ways without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. The combination of a bolt having grooves about its circumference, a flat spring ring in each groove split at a point in its circumference, and a split spring ring in the groove within such first-named ring, the second ring being bent angularly to bear alternately against the bolt and the first-named ring when the same is compressed, substantially as set forth.

2. A bolt adapted to be inserted in a receiving opening, said bolt having a groove extending around the same between the ends of the receiving opening, a resilient split ring in said groove similar in cross section to said groove, each end of said ring having flat stepped surfaces, said ring being adapted to engage the wall of said receiving opening between the ends thereof to maintain the bolt therein and to serve as an anti-rattling and lubricant retaining device, substantially as set forth.

3. A bolt adapted to be inserted in a receiving opening to hold a plurality of parts in assembled relation, said bolt comprising a body having a groove extending about the same and concentric split rings in said groove adapted to maintain the bolt within said receiving opening, substantially as set forth.

In witness whereof, I have hereunto set my hand and seal at Memphis, Tennessee, this 2nd day of June, A. D. nineteen hundred and twenty-three.

GEORGE F. COLLEY. [L. S.]